US012623515B2

(12) United States Patent
Ran et al.

(10) Patent No.: US 12,623,515 B2
(45) Date of Patent: May 12, 2026

(54) DUST COLLECTING MECHANISM, CAR AIR PURIFIER AND FAN

(71) Applicant: SUZHOU BEIANG SMART TECHNOLOGY CO., LTD., Suzhou (CN)

(72) Inventors: Hongyu Ran, Suzhou (CN); Qi Chen, Suzhou (CN); Yigang Liu, Suzhou (CN); Yaoyuan Lu, Suzhou (CN)

(73) Assignee: SUZHOU BEIANG SMART TECHNOLOGY CO., LTD., Suzhou (CN)

( * ) Notice: Subject to any disclaimer, the term of this patent is extended or adjusted under 35 U.S.C. 154(b) by 428 days.

(21) Appl. No.: 17/794,607

(22) PCT Filed: Sep. 14, 2021

(86) PCT No.: PCT/CN2021/118157
§ 371 (c)(1),
(2) Date: Jul. 21, 2022

(87) PCT Pub. No.: WO2022/198935
PCT Pub. Date: Sep. 29, 2022

(65) Prior Publication Data
US 2023/0322051 A1     Oct. 12, 2023

(30) Foreign Application Priority Data

Mar. 22, 2021     (CN) .......................... 202110304938.2

(51) Int. Cl.
*B60H 3/00*          (2006.01)
*B03C 3/08*          (2006.01)
(Continued)

(52) U.S. Cl.
CPC ............. *B60H 3/0078* (2013.01); *B03C 3/08* (2013.01); *B03C 3/41* (2013.01); *B03C 3/47* (2013.01);
(Continued)

(58) Field of Classification Search
CPC .... B03C 3/08; B03C 3/12; B03C 3/38; B03C 3/41; B03C 3/45; B03C 3/47; B03C 3/49;
(Continued)

(56) References Cited

U.S. PATENT DOCUMENTS 4,049,333 A * 9/1977 Wallace ................. H01R 11/30
                                                                      211/DIG. 1
4,058,357 A * 11/1977 Wallace .............. B60R 11/0205
                                                                      211/DIG. 1
(Continued)

FOREIGN PATENT DOCUMENTS

CN          103953978 A      7/2014
CN          104128262 A  * 11/2014
(Continued)

*Primary Examiner* — Jennifer Dieterle
*Assistant Examiner* — Sonji Turner
(74) *Attorney, Agent, or Firm* — SZDC Law PC

(57) ABSTRACT

The application provides a dust collecting mechanism, a car air purifier and a fan, and relates to the technical field of air purification. The dust collecting mechanism includes a generator assembly including a generator holder, a generator plate and a generator filament, the generator plate and the generator filament being arranged in a spaced and staggered manner inside the generator holder; a collector assembly including a collector holder, a repeller plate and a collector plate, the repeller plate and the collector plate being arranged in a spaced and staggered manner inside the collector holder. The generator holder is detachably connected with the collector holder, and the collector plate is connected and conducted with the generator filament through magnetic adsorption, so that they can be connected
(Continued)

to the power supply together, thereby enabling wireless conduction between the collector assembly and the generator assembly, simplifying the circuit structure.

8 Claims, 7 Drawing Sheets

(51) Int. Cl.
  *B03C 3/41*       (2006.01)
  *B03C 3/47*       (2006.01)
  *F04D 29/70*      (2006.01)

(52) U.S. Cl.
  CPC ...... *B03C 2201/04* (2013.01); *B03C 2201/30* (2013.01); *F04D 29/703* (2013.01)

(58) Field of Classification Search
  CPC .... B03C 3/68; B03C 3/74; B03C 3/82; B03C 3/86; B03C 2201/04; B03C 2201/28; B03C 2201/30; B60H 3/0078; B60H 3/06; F24F 8/192; F24F 8/194; F04D 29/703; A61L 9/00; A61L 9/22; A61L 2209/14; Y02A 50/2351; H01R 11/30
  See application file for complete search history.

(56)                References Cited

U.S. PATENT DOCUMENTS

| | | | | | |
|---|---|---|---|---|---|
| 5,433,772 | A | * | 7/1995 | Sikora | B03C 3/32 |
| | | | | | 55/357 |
| 5,762,665 | A | * | 6/1998 | Abrahamian | B60H 3/0007 |
| | | | | | 55/385.3 |
| 6,504,308 | B1 | * | 1/2003 | Krichtafovitch | H01J 49/04 |
| | | | | | 315/111.21 |
| 9,318,886 | B1 | * | 4/2016 | Pate | F21V 21/096 |
| 10,443,888 | B2 | * | 10/2019 | Morioka | B03C 3/82 |
| 11,050,187 | B2 | * | 6/2021 | Troufflard | H01R 13/6205 |
| 11,358,078 | B2 | * | 6/2022 | Baker | B01D 46/0086 |
| 2005/0051028 | A1 | * | 3/2005 | Botvinnik | B03C 3/60 |
| | | | | | 96/88 |
| 2005/0142047 | A1 | | 6/2005 | Baik et al. | |
| 2006/0278074 | A1 | * | 12/2006 | Tseng | B03C 3/32 |
| | | | | | 95/57 |
| 2007/0141860 | A1 | * | 6/2007 | Hernandez | H01F 38/14 |
| | | | | | 439/38 |
| 2008/0134896 | A1 | * | 6/2008 | Holmes | B03C 3/12 |
| | | | | | 96/96 |
| 2011/0111691 | A1 | * | 5/2011 | Kagawa | A61L 9/22 |
| | | | | | 454/251 |
| 2012/0295451 | A1 | * | 11/2012 | Hyun-Jun | H01R 13/6205 |
| | | | | | 439/39 |
| 2012/0312170 | A1 | * | 12/2012 | Noh | B03C 3/86 |
| | | | | | 96/100 |
| 2014/0065846 | A1 | * | 3/2014 | Poh | H01R 13/6205 |
| | | | | | 439/39 |
| 2016/0254616 | A1 | * | 9/2016 | Kim | G05B 11/01 |
| | | | | | 307/116 |
| 2017/0149171 | A1 | * | 5/2017 | Szeto | H04M 1/0274 |
| 2018/0015482 | A1 | * | 1/2018 | Rothenberg | B03C 3/368 |
| 2018/0051905 | A1 | * | 2/2018 | Morioka | B03C 3/47 |
| 2019/0103702 | A1 | * | 4/2019 | Chan | G06F 1/26 |
| 2020/0114773 | A1 | * | 4/2020 | McColl | B60L 53/16 |

FOREIGN PATENT DOCUMENTS

| | | | | |
|---|---|---|---|---|
| CN | 111250267 | A | | 6/2020 |
| CN | 210815722 | U | | 6/2020 |
| CN | 210994794 | U | * | 7/2020 |
| CN | 112268345 | A | | 1/2021 |
| CN | 113022272 | A | | 6/2021 |
| JP | H04281862 | A | | 10/1992 |
| JP | 2005334765 | A | | 12/2005 |
| JP | 5067084 | B2 | * | 11/2012 |

* cited by examiner 203     202

DUST COLLECTING MECHANISM, CAR AIR PURIFIER AND FAN

This application is the National Stage Application of PCT/CN2021/118157, filed on Sep. 14, 2021, which claims priority to Chinese Patent Application No. 202110304938.2, filed on Mar. 22, 2021, which is incorporated by reference for all purposes as if fully set forth herein.

FIELD OF THE INVENTION

The application relates to the technical field of air purification, and more particularly to a dust collecting mechanism, a car air purifier and a fan.

DESCRIPTION OF THE RELATED ART

With the increasing concern and requirements in life for air quality, it is more and more common to improve indoor/car air quality with air purifiers. An air purifier based on electrostatic dust collection technique includes an electrostatic filter element provided between an air inlet and an air outlet. The air enters the air purifier through the air inlet, passes through the electrostatic filter element, and then is discharged through the air outlet. The electrostatic filter element adsorbs pollutants in the air to purify the air. After the air purifier is used for a period of time, pollutants accumulate in the electrostatic filter element, so it is necessary to clean the electrostatic filter element regularly.

The electrostatic filter element from prior art is generally integrated, and the emitting wire in the electrostatic filter element, the repelling piece and the collecting piece in the collecting block are integrated together, making it difficult to clean.

SUMMARY OF THE INVENTION

An object of the application to provide a dust collecting mechanism, a car air purifier and a fan that that can be easily cleaned.

In a first aspect, an embodiment of the application provides a dust collecting mechanism including: a generator assembly including a generator holder, a generator plate and a generator filament, the generator plate and the generator filament being arranged in a spaced and staggered manner inside the generator holder; a collector assembly including a collector holder, a repeller plate and a collector plate, the repeller plate and the collector plate being arranged in a spaced and staggered manner inside the collector holder; wherein the generator holder is connected detachably with the collector holder, and the collector plate is connected and conducted with the generator filament through magnetic adsorption.

In the above embodiment, the collector plate is connected and conducted with the generator filament through magnetic adsorption upon alignment, so that they can be connected to the power supply together, thereby enabling wireless conduction between the collector assembly and the generator assembly, simplifying the circuit structure, avoiding difficulty in detachment due to wired connection, and consequently facilitating assembly and disassembly between the collector assembly and the generator assembly, and the detached generator assembly would not cause disturbance in cleaning of the collector plate, making cleaning less difficult.

In some embodiments, the collector plate and the generator filament are connected to a high-voltage power supply and the repeller plate and the generator plate are each grounded.

In the above embodiments, among the collector plate and the generator filament, as a conducted unit, and also the repeller plate and the generator plate, only one of them is connected to the high-voltage power supply, thereby reducing the complexity of the circuit and difficulty in wiring and improving the safety performance.

In some embodiments, an end of the collector holder is provided with a first magnetic adsorption contact, the collector plate and the generator filament being connected to the high-voltage power supply via the first magnetic adsorption contact; an end of the collector holder is provided with a second magnetic adsorption contact, the repeller plate being grounded via the second magnetic adsorption contact; and an end of the collector holder is provided with a third magnetic adsorption contact, the generator plate and the collector holder being connected and conducted through magnetic adsorption so as to be grounded via the third magnetic adsorption contact.

In the above embodiments, the end of the collector holder is placed in a corresponding position in use, so that the entire dust collecting mechanism is connected into the circuit. Connection through magnetic adsorption allows convenient removal of the dust collecting mechanism for cleaning of the collector plate in the collector assembly.

In some embodiments, a handle is provided on the side of the generator holder facing away from the collector holder.

In the above embodiments, by holding the handle, the generator holder can be easily moved, and assembly and disassembly of the generator holder and the collector holder can be facilitated. Also, as the generator holder and the collector holder form an overall dust collecting mechanism upon connection, by holding the handle or gripping the handle with a tool, the dust collecting mechanism can be conveniently moved, and assembly and disassembly of the dust collecting mechanism can be facilitated.

In some embodiments, the spacing between the collector plate and the repeller plate is 1-2 mm.

In the above embodiment, this spacing is defined to both ensure unobstructed air flow and ensure the collection efficiency to the greatest extent, thereby achieving greater purification efficiency with the same size.

In some embodiments, the generator holder is in threaded connection with the collector holder; or the generator holder is provided with a first clamping piece and the collector holder is provided with a second clamping piece, and the first clamping piece and the second clamping piece cooperate with each other such that the generator holder is detachably connected to the collector holder.

In the above embodiments, assembly and disassembly of the generator holder and the collector holder involves simple and easy operation.

In a second aspect, the application provides a car air purifier including the dust collecting mechanism described as above.

In some embodiments, the car air purifier further includes: a support base provided in the interior space of the car; a mounting base provided on the support base, the dust collecting mechanism being provided on the mounting base; an air inlet provided on the mounting base and close to the generator assembly of the dust collecting mechanism; an air outlet provided on the mounting base and close to the collector assembly of the dust collecting mechanism; and a blower provided at the air inlet and/or the air outlet to provide negative pressure.

In the embodiments above, one end of the support base is fixed to the interior space of the car, and the other end thereof supports the mounting base in a preset position. The dust collecting mechanism is provided on the mounting base as the dust collecting body and the mounting base is provided with an air inlet, an air outlet and a blower thereon to form an air flow passage. The air inside the car is driven by the negative pressure from the blower to enter the generator assembly, whereupon the pollutant particles are ionized. Then the air enters the collector assembly, whereupon the ionized pollutant particles are adsorbed to the collector plate. The purified air flows out through the air outlet, thus an air circulation process is accomplished. This air circulation process is performed continuously during the operation of the car air purifier.

In some embodiments, the mounting base is rotatably provided on the support base for adjusting the mounting base so that a preset included angle is maintained between the mounting base and the horizontal plane.

In the above embodiments, the air enters the dust collecting mechanism at a preset angle and discharged at a preset angle after being purified so as to ensure unobstructed air flow and reduce the noise.

In a third aspect, the application provides a fan including the dust collecting mechanism described above.

In the embodiments above, with the dust collecting mechanism described above, the collector plate is connected and conducted with the generator filament through magnetic adsorption upon alignment, so that they can be connected to the power supply together, thereby enabling wireless connection between the collector assembly and the generator assembly, simplifying the circuit structure, avoiding difficulty in detachment due to wired connection, and consequently facilitating assembly and disassembly between the collector assembly and the generator assembly, and the detached generator assembly would not cause disturbance in cleaning of the collector plate, making cleaning less difficult. Also, the dust collecting mechanism filters the air supplied from the fan, so that the fan can supply dust-free air that is desirably clean, which can meet usage requirements by susceptible population.

BRIEF DESCRIPTION OF THE DRAWINGS

In order to explain the technical solution of the embodiments of the application more clearly, the drawings that need to be used in the embodiments of the application will be briefly introduced in the following. It should be understood that the following drawings only show some embodiments of the application, so they should not be regarded as limiting the scope. For those of ordinary skill in the art, other relevant drawings can be obtained according to these drawings without any creative effort.

REFERENCE NUMERALS

Figure 1:
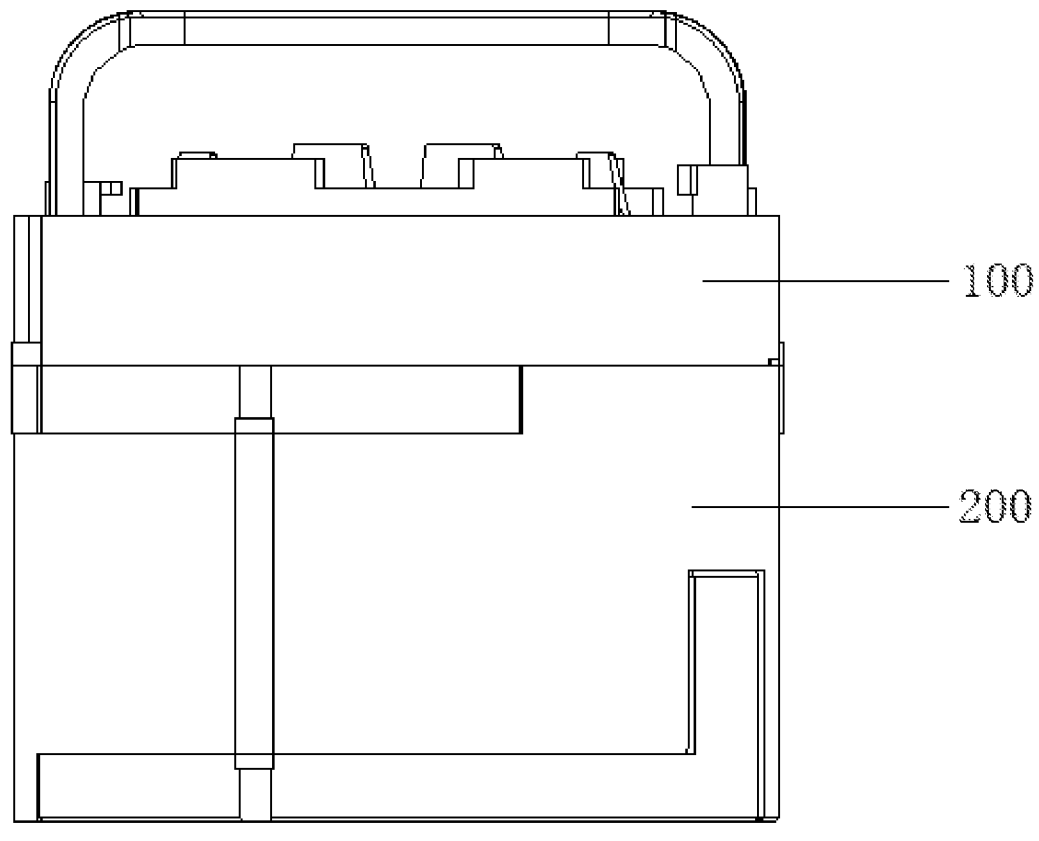
FIG. 1 is a schematic structural view of a dust collecting mechanism according to an embodiment of the application.

100 generator assembly; 101 generator holder; 102 generator plate; 103 handle; 104 generator filament; 200 collector assembly; 201 collector holder; 202 collector plate; 203 repeller plate; 204 first magnetic adsorption contact; 205 second magnetic adsorption contact; 206 third magnetic adsorption contact; 300 support base; 400 mounting base; 500 air inlet; 600 air outlet; 700 blower

DETAILED DESCRIPTION OF THE PREFERRED EMBODIMENTS

The technical solutions in the embodiments of the application will be described below with reference to the drawings in the application.

It should be noted that similar reference numerals and letters indicate similar items in the following drawings. Therefore, once a certain item is defined in one figure, it is not necessary to further define and explain it in subsequent figures. Meanwhile, in the description of the application, the terms "first" and "second" are only intended for distinguishment in the description, and cannot be understood as indicating or implying relative importance.

In a first aspect, an embodiment of the application provides a dust collecting mechanism as shown in FIGS. 1-6 and 8, including: a generator assembly 100 which includes a generator holder 101, a generator plate 102 and a generator filament 104, wherein the generator plate 102 and the generator filament are arranged in a spaced and staggered manner inside the generator holder 101; a collector assembly 200 including a collector holder 201, a repeller plate 203 and a collector plate 202, wherein the repeller plate 203 and the collector plate 202 are arranged in a spaced and staggered manner inside the collector holder 201. The generator holder 101 is connected detachably with the collector holder 201, and the collector plate 202 is connected and conducted with the generator filament through magnetic adsorption.

In use, the generator holder 101 and the collector holder 201 are connected to each other to further combine the generator assembly 100 with the collector assembly 200 for use. The generator filament and the collector plate 202 are connected and conducted through magnetic adsorption and are connected to the power supply together. In the generator assembly 100, an electric field is generated between the generator filament and the generator plate 102. In the collector assembly 200, an electric field is generated between the collector plate 202 and the repeller plate 203. After entering the generator assembly 100, the air including pollutant particles is ionized under effect of the electric field between the generator filament and the generator plate 102. After entering the collector assembly 200, the ionized pollutant particles are adsorbed to the collector plate 202 under effect of the electric field, and the air purification process is accomplished. If the dust collecting mechanism needs cleaning after being used for a period of time, the generator holder 101 and the collector holder 201 are dissembled and further the generator assembly 100 and the collector assembly 200 are dissembled, so that the collector plate 202 in the collector assembly 200 cam be cleaned separately.

It can be seen that in the dust collecting mechanism according to this embodiment, the collector plate 202 is connected and conducted with the generator filament through magnetic adsorption upon alignment, so that they can be connected to the power supply together, thereby enabling wireless conduction between the collector assembly 200 and the generator assembly 100, simplifying the circuit structure, avoiding difficulty in detachment due to wired connection, and consequently facilitating assembly and disassembly between the collector assembly 200 and the generator assembly 100, and the detached generator assembly 100 would not cause disturbance in cleaning of the collector plate 202, making cleaning less difficult.

The generator holder 101 and collector holder 201 may be configured as cylindrical structure with opened ends, for example, a hollow column or prism or the like. No limitation is made in this embodiment in this regard, as long as a passage can be formed for the air containing pollutants passing therethrough.

Figure 5:
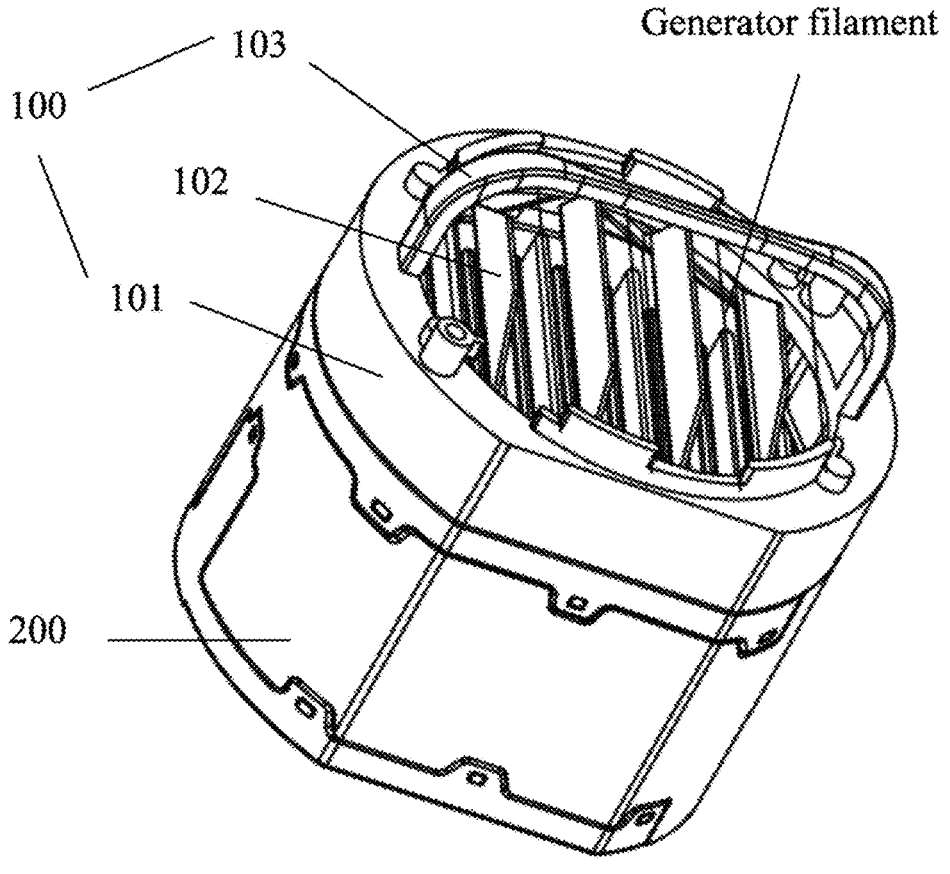
FIG. 5 is a schematical perspective structural view of a dust collecting mechanism according to an embodiment of the application.

Referring to FIG. 5, the generator plate 102 and the generator filament are arranged in a spaced and staggered manner inside the generator holder 101. Specifically, the ends of the generator plate 102 are connected respectively to the inner wall of the generator holder 101 and multiple generator plates 102 are distributed in parallel and spaced apart from each other inside the generator holder 101. The ends of the generator filament are connected respectively inside the generator holder 101, and the multiple generator filaments are distributed in parallel and spaced apart from each other inside the generator holder 101. The generator plates 102 and the generator filaments are arranged in a spaced and staggered manner, i.e., each generator filament is positioned between two adjacent generator plates 102 and each generator plate 102 is positioned between two adjacent generator filaments. In an embodiment, the number of the generator plates 102 may be the same as that of the generator filaments, or the difference can be 1. For example, when three generator plates 102 and two generator filaments are provided in the generator holder 101, they may be arranged sequentially in the order of a generator plate 102, a generator filament, a generator plate 102, a generator filament, and a generator plate 102.

The generator plate 102 and the generator filament are fixedly connected to the inner wall of the generator holder 101 by such as welding, or detachably connected to the inner wall of the generator holder 101 by such as clamping, fastening, entangling or the like. No limitation is made in this embodiment in this regard.

Figure 4:
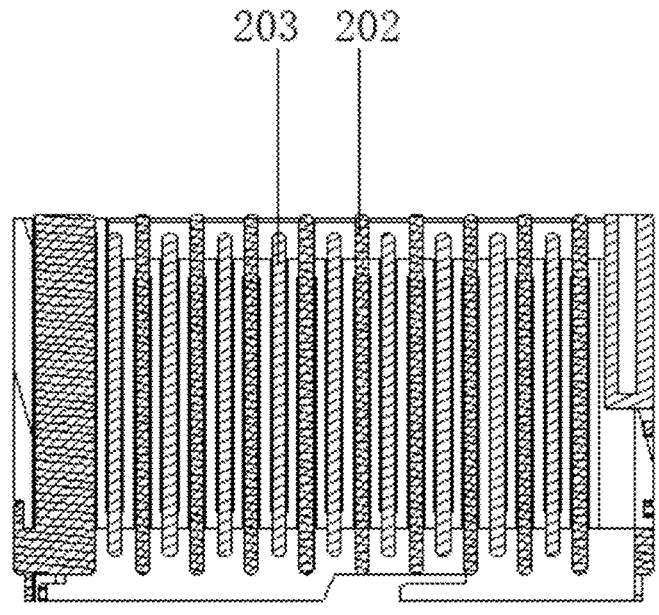
FIG. 4 is a schematic structural view of a collector plate and a repeller plate arranged in a staggered manner in a dust collecting mechanism according to an embodiment of the application.
Figure 6:
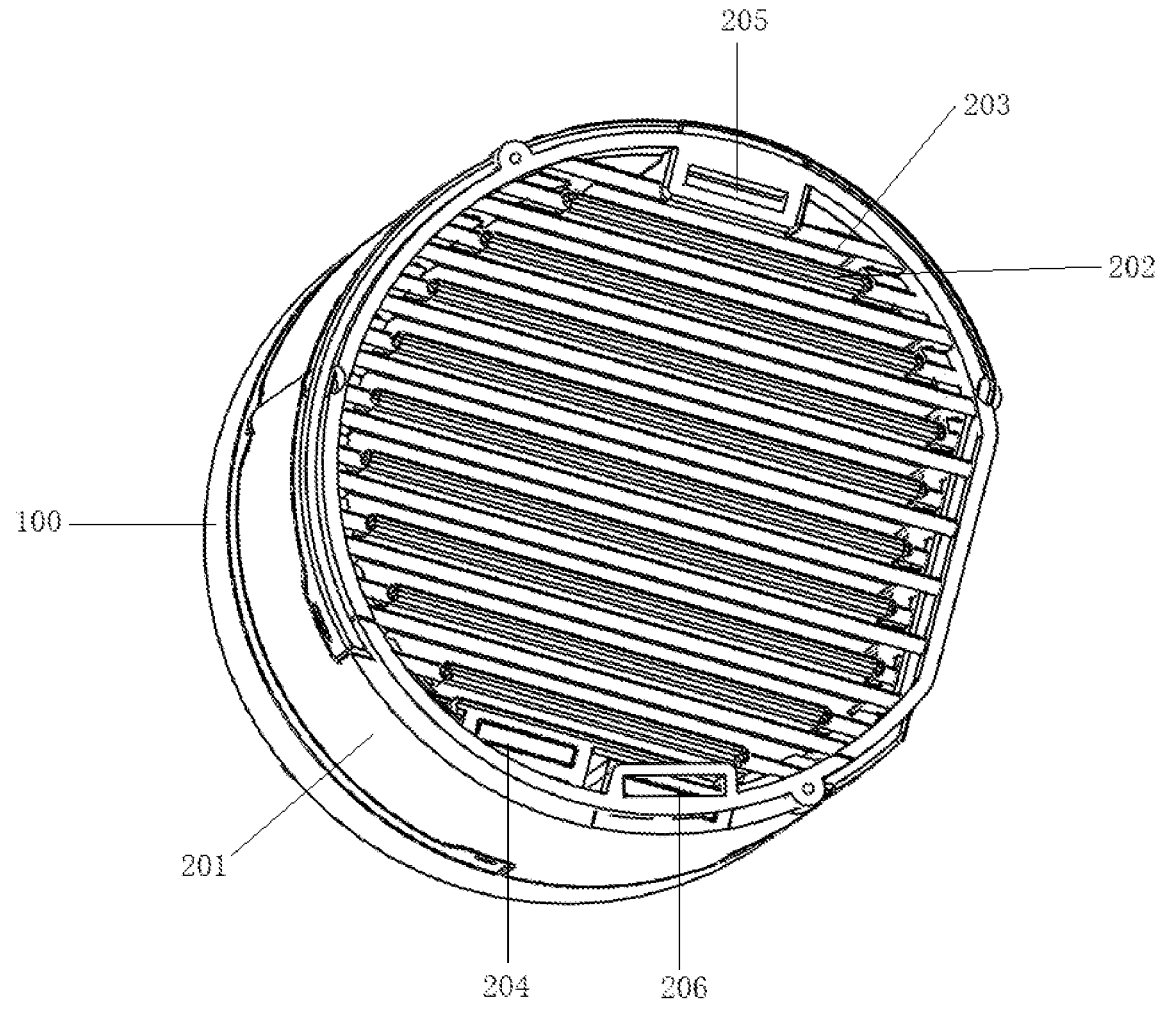
FIG. 6 is a schematical perspective structural view of a dust collecting mechanism according to another embodiment of the application.

Likewise, referring to FIGS. 4 and 6, the repeller plate 203 and the collector plate 202 are disposed in a spaced and staggered manner in the collector holder 201. That is, the ends of the repeller plate 203 are connected respectively to the inner wall of the collector holder 201 and multiple repeller plates 203 are distributed in parallel and spaced apart from each other in the collector holder 201. The ends of the collector plate 202 are connected respectively inside the collector holder 201, and multiple collector plates 202 are distributed in parallel and spaced apart from each other inside the collector holder 201. The repeller plates 203 and the collector plates 202 are disposed in a spaced and staggered manner, i.e., each collector plate 202 is positioned between two adjacent repeller plates 203 and each repeller plate 203 is positioned between two adjacent collector plates 202. In an embodiment, the repeller plates 203 and the collector plates 202 may be of the same number or have a difference in number of 1. For example, when three repeller plates 203 and two collector plates 202 are provided in the collector holder 201, they may be arranged sequentially in the order of a repeller plate 203, a collector plate 202, a repeller plate 203, a collector plate 202 and a repeller plate 203.

The repeller plate 203 and the generator plate 102 may be fixedly connected to the inner wall of the collector holder 201 by such as welding, or detachably connected to the inner wall of the collector holder 201 by such as clamping, fastening, or the like. No limitation is made in this embodiment in this regard. For example, axial grooves are provided on the inner wall of the collector holder 201. The ends of the collector plate 202 are inserted respectively into the groove and stopped within the groove through friction, clamping, or the like, so that the collector plate 202 may be removed from or put back into the collector holder 201 through axial pulling or pushing. With such an arrangement, during cleaning, the generator assembly 100 and the collector assembly 200 may be detached and then the collector plate 202 is removed for separate cleaning, so that difficulty in cleaning is further reduced.

In this embodiment, the collector plate 202 and the generator filament are connected and conducted through magnetic adsorption. Specifically, after the generator holder 101 and the collector holder 201 are connected, the multiple collector plates 202 and the multiple generator filaments contact with each other in one-to-one correspondence and pressed against each other through magnetic adsorption. The two conductors in contact with each other can be connected to the power supply together. Said magnetic adsorption force is defined such that the generator filament and the collector plate 202 can keep tight contact in use and the generator holder 101 and the collector holder 201 can be detached conveniently, as can be adaptively set by those skilled in the art depending on the practical operating conditions, and no limitation is made in this embodiment in this regard.

It is understood that, for the purpose of dust collection, a voltage difference should be created between the generator filament and the generator plate 102 to generate an electric field for ionizing pollutant particles. A voltage difference should be created between the collector plate 202 and the repeller plate 203 to generate an electric field for adsorbing pollutants. In this embodiment, the generator filament and the generator plate 102 are connected and conducted through magnetic adsorption, both with like charges. The generator plate 102 may be grounded or have opposite charges and the repeller plate 203 may be grounded or have opposite charges, as long as an electric field can be generated.

In some optional implementations of this embodiment, the collector plate 202 and the generator filament are connected to the high-voltage power supply and the repeller plate 203 and the generator plate 102 are each grounded.

With such an arrangement, among the collector plate 202 and the generator filament, as a conducted unit, and also the repeller plate 203 and the generator plate 102, only one of them is connected to the high-voltage power supply, thereby reducing the complexity of the circuit and difficulty in wiring and improving the safety performance.

The repeller plate 203 and the generator plate 102 can be jointly grounded. The repeller plate 203 and the generator plate 102 may also have separate grounded circuits, and a resistor may be connected to the grounded circuit of the repeller plate 203. In this way, sparking can be prevented from occurring on the repeller plate 203, thereby improving the safety performance.

In some optional implementations of this embodiment, a first magnetic adsorption contact 204 is provided on an end of the collector holder 201, and the collector plate 202 and the generator filament are connected to the high-voltage power supply via the first magnetic adsorption contact 204. A second magnetic adsorption contact 205 is provided on an end of the collector holder 201, and the repeller plate 203 is grounded via the second magnetic adsorption contact 205. A third magnetic adsorption contact 206 is provided on an end of the collector holder 201, and the generator plate 102 and the collector holder 201 are connected and conducted through magnetic adsorption to be grounded via the third magnetic adsorption contact 206.

With such an arrangement, the end of the collector holder 201 can be placed in a corresponding position, so that the dust collecting mechanism can be connected into the circuit as a whole. Connection through magnetic adsorption permits the dust collecting mechanism to be conveniently removed so as to clean the collector plate 202 in the collector assembly 200.

The first magnetic adsorption contact 204, the second magnetic adsorption contact 205 and the third magnetic adsorption contact 206 may be positioned on the end of the collector holder 201 facing away from the generator holder 101 to facilitate connection to the high-voltage power supply or being grounded.

The collector plate 202 and the generator filament are connected to the high-voltage power supply via the first magnetic adsorption contact 204. Specifically, the first magnetic adsorption contact 204 and the various collector plates 202 are conducted via conductor wires or metal conductor plates. When the first magnetic adsorption contact 204 is connected to the power supply connection contact, the various collector plates 202 are connected to the high-voltage power supply. Said conductor wire and metal conductor plate may be pressed against the inner wall of the collector holder 201 or inserted into the collector holder 201, thereby reducing disturbance in cleaning of the collector plate 202.

Said repeller plates 203 are grounded via the second magnetic adsorption contact 205. Specifically, the second magnetic adsorption contact 205 is conducted with various repeller plates 203 via the conductor wire or the metal conductor plate. When the second magnetic adsorption contact 205 is connected to the contact on the ground wire in the car, various repeller plates 203 are grounded. Said conductor wire and metal conductor plate may be pressed against the inner wall of the collector holder 201 or inserted into the collector holder 201, thereby reducing disturbance in cleaning of the collector plate 202.

Said generator plate 102 and collector holder 201 are connected and conducted through magnetic adsorption so as to be grounded via the third magnetic adsorption contact 206. Specifically, the various generator plates 102 are conducted with a certain point on the generator holder 101 via a conductor wire or a metal conductor plate. This point on the generator holder 101 is in contact with a corresponding point on the collector holder 201 and conducted therewith and is further conducted with the third magnetic adsorption contact 206. At this time, the conductor wire or the metal conductor plate may be pressed against the inner wall of the generator holder 101 or inserted into the inner wall of the generator holder 101. Alternatively, the collector holder 201 may be a conductor as a whole, and the various generator plates 102 are respectively in contact with the collector holder 201 and conducted therewith through magnetic adsorption, and are further conducted with the third magnetic adsorption contact 206 situated at the end of the collector holder 201.

Figure 2:
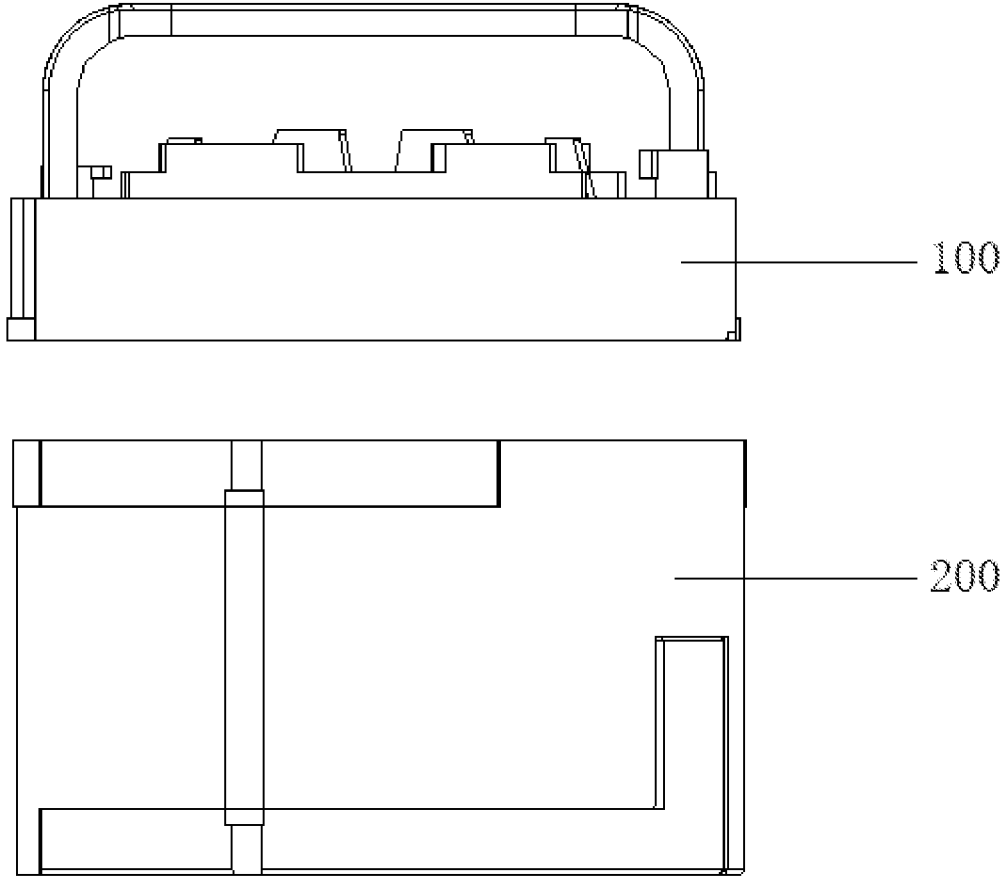
FIG. 2 is a schematic structural view of a detached dust collecting mechanism according to an embodiment of the application.
Figure 3:
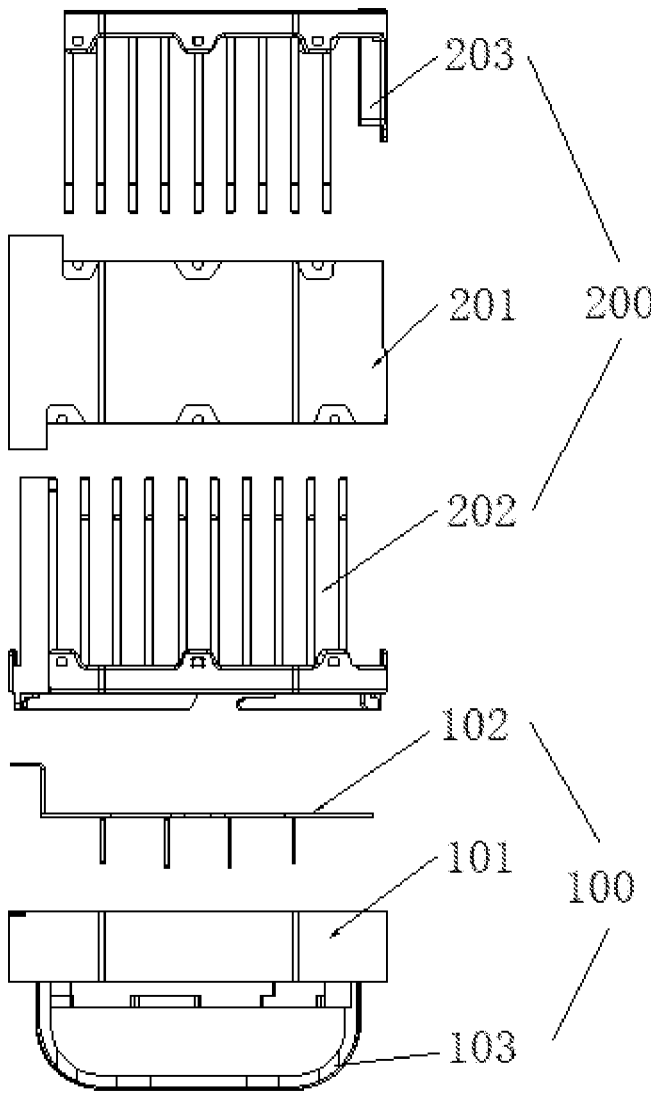
FIG. 3 is an exploded view of a dust collecting mechanism according to an embodiment of the application.

In some optional implementations of this embodiment, as shown in FIGS. 1-3, a handle 103 is provided on the side of the generator holder 101 facing away from the collector holder 201. With such an arrangement, by holding the handle 103, the generator holder 101 can be easily moved, so that the generator holder 101 and the collector holder 201 can be easily assembled and disassembled. Also, as the generator holder 101 and the collector holder 201 form an overall dust collecting mechanism upon connection, by holding the handle 201 or gripping the handle 201 with a tool, the dust collecting mechanism can be conveniently moved, so that the dust collecting mechanism can be easily assembled and disassembled.

Said handle 103 may be arc-shaped. The ends of the arc-shaped handle 103 are connected to the ends of the generator holder 101. Alternatively, said handle 103 may include a handheld portion and a connection portion connected with the ends of the handheld portion. The connection portion is connected to the ends of the generator holder 101. The handheld portion may be configured as a bar-shaped or an arc-shaped structure or the like to be easily held. The handheld portion may further be provided with an ergonomic design such as finger receiving part. A smooth transition segment may be provided between the handheld portion and the connection portion to allow smooth transition in the whole handle 103.

In some optional implementations of this embodiment, as shown in FIG. 4, the spacing between the collector plate 202 and the repeller plate 203 is 1-2 mm. For example, this spacing may be 1 mm, 1.5 mm, 2 mm etc. Such an arrangement can both ensure unobstructed air flow and ensure the collection efficiency to the greatest extent, thereby achieving greater purification efficiency with the same size.

In this embodiment, the generator holder 101 and the collector holder 201 are detachably connected. An example of the specific connection manner is described below.

In some implementations of this embodiment, the generator holder 101 is in threaded connection with the collector holder 201. With such an arrangement, detachable connection between the two can be achieved conveniently through rotation. It is understood that in this implementation, it is provided that when the generator holder 101 and the collector holder 201 are rotated to be fixed to each other during threaded connection, the generator filament and the collector plate 202 are exactly aligned and in contact.

In some implementations of this embodiment, the generator holder 101 is provided with a first clamping piece and the collector holder 201 is provided with a second clamping piece. The first clamping piece and the second clamping piece cooperate with each other such that the generator holder 101 is detachably connected with the collector holder 201.

Said first clamping piece may be a male or female fastener or a buckle. The first clamping piece and the second clamping piece may be axially aligned. The generator holder 101 and the collector holder 201 are clamped under axial pressure upon their approach and are released and detached under axial pull. The first clamping piece and second clamping piece may be circumferentially aligned, and the generator holder 101 and the collector holder 201 are clamped or detached in rotation relative to each other upon their alignment. At this time, it is provided that when the generator holder 101 and the collector holder 201 are rotated to be fixed to each other, the generator filament and the collector plate 202 are exactly aligned and in contact.

Taking a cylindrical collector holder 201 and generator holder 101 as an example, the axial direction means the axial direction of the collector holder 201 and the generator holder 101 and the circumferential direction means the circumferential direction of the collector holder 201 and the generator holder 101.

In a second aspect, this embodiment provides a car air purifier including any one of the dust collecting mechanisms described above.

In the car air purifier according to this embodiment, the collector plate 202 is connected and conducted with the generator filament through magnetic adsorption upon alignment, so that they can be connected to the power supply together, thereby enabling wireless connection between the collector assembly 200 and the generator assembly 100, simplifying the circuit structure, avoiding difficulty in detachment due to wired connection, and consequently facilitating assembly and disassembly between the collector assembly 200 and the generator assembly 100, and the detached generator assembly 100 would not cause disturbance in cleaning of the collector plate 202, making cleaning less difficult.

Figure 7:
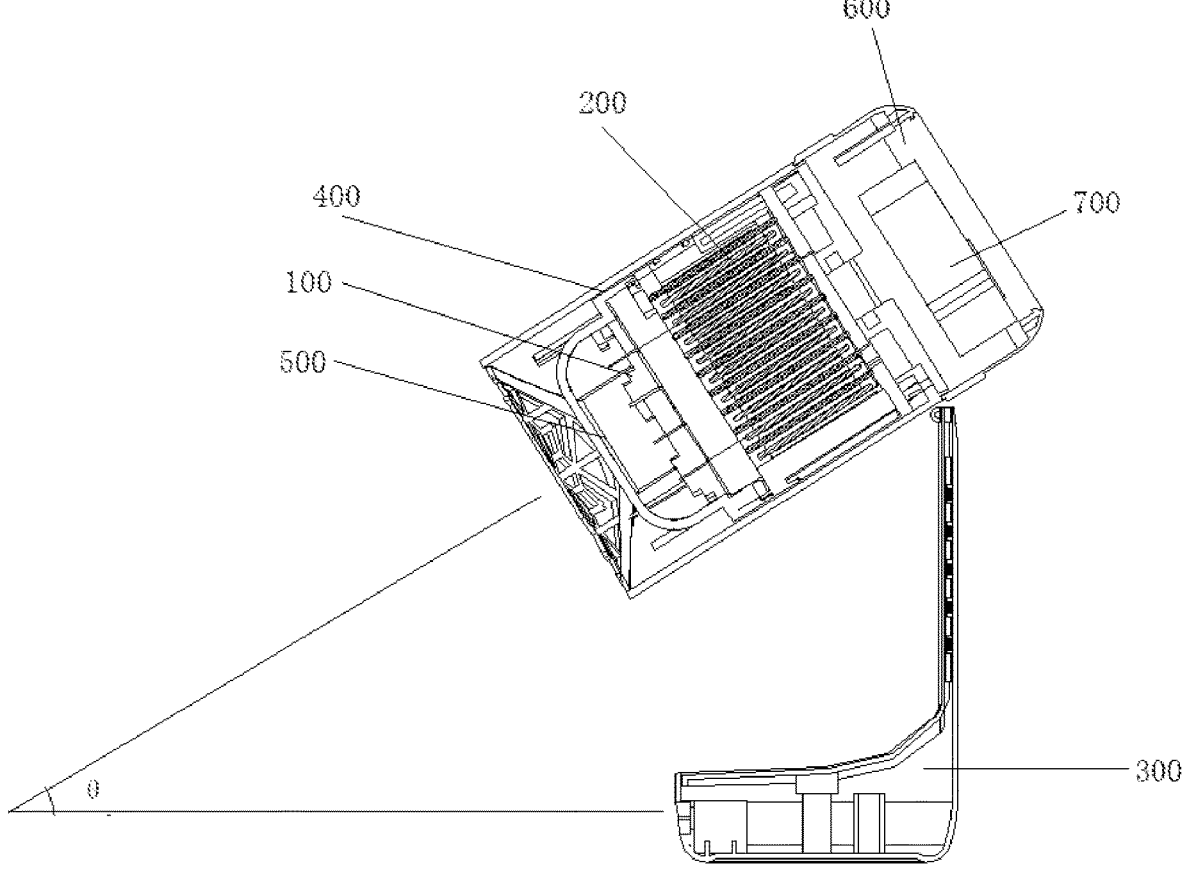
FIG. 7 is a schematical structural view of a car air purifier according to an embodiment of the application.
Figure 8:
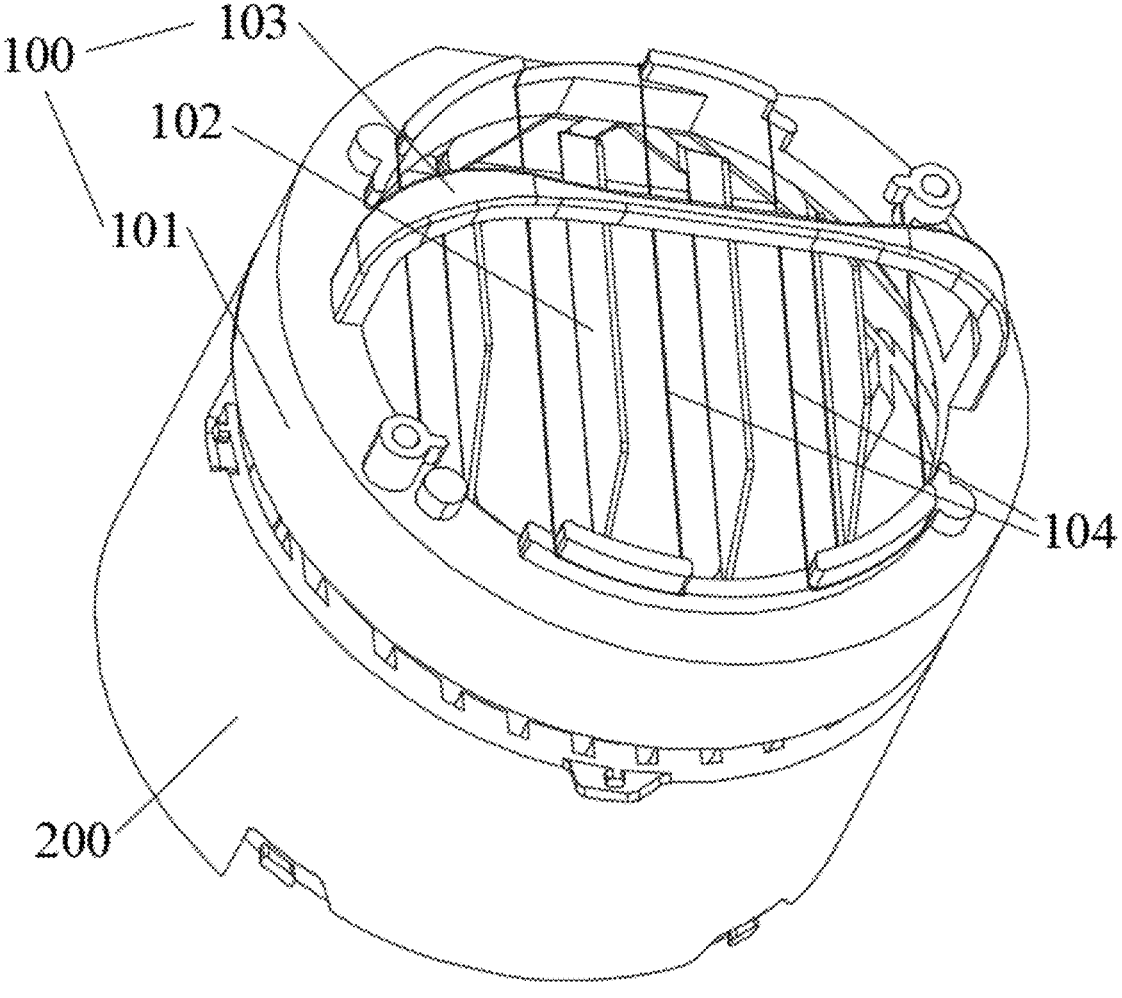
FIG. 8 is another schematical perspective structural view of a dust collecting mechanism according to an embodiment of the application, and the structures under generator plates are removed to show generator filaments.

In some optional implementations of this embodiment, as shown in FIG. 7, this car air purifier further includes: a support base 300 provided inside the car; a mounting base 400 provided on the support base 300, wherein the dust collecting mechanism is provided on the mounting base 400; an air inlet 500 provided on the mounting base 400 and close to the generator assembly 100 of the dust collecting mechanism; an air outlet 600 provided on the mounting base 400 and close to the collector assembly 200 of the dust collecting mechanism; and a blower 700 provided at the air inlet 500 and/or the air outlet 600 for providing negative pressure.

With such an arrangement, one end of the support base 300 is fixed inside the car, and the other end thereof supports the mounting base 400 in a preset position. The dust collecting mechanism is provided on the mounting base 400 as the dust collecting body and the mounting base 400 is provided with an air inlet 500, an air outlet 600 and a blower 700 to form an air flow passage. The air inside the car is driven by the negative pressure from the blower 700 to enter the generator assembly 100, whereupon the pollutant particles are ionized. Then the air enters the collector assembly 200, whereupon the ionized pollutant particles are adsorbed to the collector plate 202. The purified air flows out through the air outlet 600, thus an air circulation process is accomplished. This air circulation process is performed continuously during the operation of the car air purifier.

The blower 700 is separated from the dust collecting mechanism by a certain space to ensure unobstructed air flow. For example, this space may be 8 mm, 10 mm or 12 mm.

In some optional implementations of this embodiment, the mounting base 400 is rotatably provided on the support base 300 so that the mounting base 400 can be adjusted to to present a preset included angle with respect to the horizontal plane. With such an arrangement, the air enters the dust collecting mechanism at a preset angle and discharged at a preset angle after being purified so as to ensure unobstructed air flow and reduce the noise.

The mounting base 400 may be rotatably provided on the support base 300 through articulation, a rotary shaft or the like. A locking piece may further be provided between the mounting base 400 and the support base 300 to lock the mounting base 400 once it is rotated to the preset position, while keeping a constant angle between the mounting base 400 and the support base 300. For example, in the case where the mounting base 400 and the support base 300 are rotatably connected through a rotary shaft, the locking piece may be a retaining nut fitted on the rotary shaft through threaded connection. Once the retaining nut is loosened, the mounting base 400 and the support base 300 can rotate relative to each other around the rotary shaft. Once adjusted to the preset position, the retaining nut is tightened to lock the support base 300 with the mounting base 400 by friction under pressure.

The angle between the mounting base 400 and the horizontal plane may be the angle θ as shown in FIG. 7, which is an acute angle of e.g. 30°, 45°, 60° etc, that can be adjusted in use according to the practical condition.

In some optional implementations of this embodiment, the inner wall of the air inlet 500 is provided with an air inlet grille and/or the inner wall of the air outlet 600 is provided with an air outlet grille. By providing this air inlet grille and/or air outlet grille, the unobstructed air flow can be improved and the noise can be reduced.

In some optional implementations of this embodiment, the support base 300 may include a seat and a holder. The seat is provided at a preset portion inside the car, and the holder is connected to the support base 300 to support the mounting base 400 in the preset position. FIG. 7 shows the case in which the holder is vertically connected to the seat. It is understood that the structure and position of the support base 300 can be set according to the practical requirements, as long as the mounting base 400 remains in the preset position in the car.

A controller may be installed in the seat. The controller may include a power control module and an on-off control module to control the switch on and off and the power of the car air purifier.

In this embodiment, the mounting base 400 of the car air purifier may be provided with a power supply connection contact for connection with the high-voltage circuit in the car to connect the first magnetic adsorption contact 204 to the car high-voltage power supply and a ground wire contact for connection with the ground wire in the car to ground the second magnetic adsorption contact 205 and the third magnetic adsorption contact 206. Alternatively, the mounting base 400 or the support base 300 of the car air purifier may be provided with a lithium cell or an accumulator that supplies power to the dust collecting mechanism. As such, there is no connection between the car air purifier and the car body, and the car air purifier is mobile and can be installed at any position in the car body.

In a third aspect, this embodiment provides a fan including any one of the dust collecting mechanisms described above.

In the fan according to this embodiment, with the dust collecting mechanism described above, the collector plate 202 and the generator filament are connected and conducted through magnetic adsorption upon alignment, so that they can be connected to the power supply together, thereby enabling wireless connection between the collector assembly 200 and the generator assembly 100, simplifying the circuit structure, avoiding difficulty in detachment due to wired connection, and consequently facilitating assembly and disassembly between the collector assembly 200 and the generator assembly 100, and the detached generator assembly 100 would not cause disturbance in cleaning of the collector plate 202, making cleaning less difficult. Also, the dust collecting mechanism filters the air supplied from the fan, so that the fan can supply dust-free air that is desirably clean, which can meet usage requirements for susceptible population.

The fan may be installed in a preset portion inside the car and may be provided with a power supply connection contact for connection with the high-voltage circuit in the car to connect the first magnetic adsorption contact 204 to the car high-voltage power supply, and a ground wire contact for connection with the ground wire in the car to ground the second magnetic adsorption contact 205 and the third magnetic adsorption contact 206. Alternatively, the fan may be provided with a lithium cell or an accumulator that supplies power to the dust collecting mechanism. As such, the fan is mobile and can be installed at any position or be handheld or the like.

Similar to the car air purifier, the fan may include a support portion; a mounting portion provided on the support portion, wherein the dust collecting mechanism is provided on the mounting portion; and a blower assembly provided on the mounting portion for air blowing.

Alternatively, the mounting portion is rotatably provided on the support portion for adjusting the mounting portion and the support portion to maintain a preset included angle therebetween. With such an arrangement, the air can enter the dust collecting mechanism at a preset angle, and the purified air can be discharged at a preset angle, thereby ensuring unobstructed air flow, reducing the noise, and providing air blowing at various angles.

The mounting portion may be rotatably provided on the support portion through articulation, a rotary shaft or the like. A locking piece may further be provided between the mounting portion and the support portion to lock the mounting portion once it is rotated to the preset position, while keeping a constant angle between the mounting portion and the support portion. For example, in the case where the mounting portion and the support portion are rotatably connected through a rotary shaft, the locking piece may be a retaining nut fitted on the rotary shaft through threaded connection. Once the retaining nut is loosened, the mounting portion and the support portion can rotate relative to each other around the rotary shaft. Once adjusted to the preset position, the retaining nut is tightened to lock the support portion with the mounting portion by friction under pressure.

Described above are only examples of the application, which are not intended to limit the scope of protection of the application. For those skilled in the art, the application can have various modifications and variations. Any modification, equivalent substitution, improvement, etc. made within the spirit and principle of the application shall fall within the scope of protection of the application. It should be noted that similar numbers and letters indicate similar items in the following drawings, so once an item is defined in one figure, it does not need to be further defined and explained in subsequent figures.

Described above are only particular embodiments of the application, but the scope of protection of the application is not limited thereto. Those skilled in the art can easily conceive of changes or substitutions within the technical scope disclosed in the application, which should be covered by the scope of protection of the application. Therefore, the scope of protection of the application should be defined by the scope of protection of the claims.

It should be noted that in this specification, relational terms such as first and second are only used to distinguish one entity or operation from another entity or operation, without necessarily requiring or implying any such actual relationship or order between these entities or operations. Moreover, the term "including", "comprising" or any other variation thereof is intended to cover non-exclusive inclusion, so that a process, method, article or device that includes a series of elements not only includes those elements, but also other elements not explicitly listed, or also includes elements inherent to such a process, method, article or device. Without further restrictions, the element defined by the statement "including a . . . " does not exclude the existence of another identical element in the process, method, article or device that includes the element.

What is claimed is:

1. A dust collecting mechanism comprising:

a generator assembly including a generator holder, a plurality of generator plates and a plurality of generator filaments, the plurality of generator plates and the plurality of generator filaments being arranged in a spaced and staggered manner inside the generator holder; the ends of the generator filament are connected respectively inside the generator holder, and the multiple generator filaments are distributed in parallel and spaced apart from each other inside the generator holder; and a collector assembly including a collector holder, a plurality of repeller plates and a plurality of collector plates, the plurality of repeller plates and the plurality of collector plates being arranged in a spaced and staggered manner inside the collector holder;

wherein the generator holder is connected detachably with the collector holder, and the plurality of collector plates are connected electrically with the plurality of generator filaments thereby enabling wireless conduction between the collector assembly and the generator assembly, and each individual collector plate of the plurality of collector plates and each individual generator filament of the plurality of generator filaments contact with one another in one-to-one correspondence pressed against each other;

wherein the plurality of collector plates and the plurality of generator filaments are connected to a high-voltage power supply to enable wireless connection (electrically connected without wires) between the collector assembly and the generator assembly, and the plurality of repeller plates and the plurality of generator plates are each grounded;

wherein the collector holder is provided with a first magnetic adsorption contact, a second magnetic adsorption contact, and a third magnetic adsorption contact, and the first, second and third magnetic adsorption contacts are facing away from the generator holder to facilitate connection to the high-voltage power supply;

wherein the plurality of collector plates and the plurality of generator filaments are connected to the high-voltage power supply via the first magnetic adsorption contact;

wherein the plurality of repeller plates are grounded via the second magnetic adsorption contact; and wherein the plurality of generator plates and the collector holder are connected and conducted wirelessly so as to be grounded via the third magnetic adsorption contact.

2. The dust collecting mechanism of claim 1, wherein a handle is provided on the side of the generator holder facing away from the collector holder.

3. The dust collecting mechanism of claim 1, wherein a spacing between the plurality of collector plates and the plurality of repeller plates is 1-2 mm.

4. The dust collecting mechanism of claim 1, wherein the generator holder is in threaded connection with the collector holder; or the generator holder is provided with a first clamping piece and the collector holder is provided with a second clamping piece, and the first clamping piece and the second clamping piece cooperate with each other such that the generator holder is detachably connected to the collector holder.

5. A car air purifier, comprising the dust collecting mechanism of claim 1.

6. The car air purifier of claim 5, further comprising:

a support base provided in the interior space of the car;

a mounting base provided on the support base, the dust collecting mechanism being provided on the mounting base;

an air inlet provided on the mounting base and close to the generator assembly of the dust collecting mechanism;

an air outlet provided on the mounting base and close to the collector assembly of the dust collecting mechanism; and a blower provided at the air inlet and/or the air outlet to provide negative pressure.

7. The car air purifier of claim 6, wherein the mounting base is rotatably provided on the support base for adjusting the mounting base so that a preset included angle is maintained between the mounting base and the horizontal plane.

8. A fan, comprising the dust collecting mechanism of claim 1.

\* \* \* \* \*